United States Patent [19]
Zhuang et al.

[11] Patent Number: 6,114,405
[45] Date of Patent: Sep. 5, 2000

[54] ULTRAVIOLET RADIATION-CURABLE LIGHT-MODULATING FILM FOR A LIGHT VALVE, AND METHOD OF MAKING SAME

[75] Inventors: Huifang Zhuang, Glen Cove; Steven M. Slovak, N. Massapequa; Robert L. Saxe, New York, all of N.Y.

[73] Assignee: Research Frontiers Incorporated, Woodbury, N.Y.

[21] Appl. No.: 08/947,599

[22] Filed: Oct. 9, 1997

[51] Int. Cl.[7] .................. C08F 2/46; C08J 3/28; C08K 3/28; G02B 26/00
[52] U.S. Cl. .................. 522/99; 522/148; 522/172; 522/71; 522/74; 522/96; 522/93; 522/100; 522/102; 522/152; 522/170; 522/157; 522/168; 359/296
[58] Field of Search .................. 522/99, 148, 172, 522/80, 79, 71, 74, 75, 77, 78, 81, 83, 100, 96, 102, 152, 157, 168, 170; 359/296

[56] References Cited

U.S. PATENT DOCUMENTS

| | | | |
|---|---|---|---|
| 5,377,042 | 12/1994 | Chahroudi | 359/241 |
| 5,404,245 | 4/1995 | Chahroudi | 359/289 |
| 5,462,492 | 10/1995 | Check, III | 359/296 |
| 5,463,491 | 10/1995 | Check, III | 359/296 |
| 5,516,455 | 5/1996 | Jacobine et al. | 252/299.01 |

Primary Examiner—James J. Seidleck
Assistant Examiner—Sanza L. McClendon
Attorney, Agent, or Firm—Graham & James LLP

[57] ABSTRACT

A method for preparing a film suitable for use as the light-modulating unit of an SPD light valve, which film comprises a cross-linked polymer matrix having droplets of a liquid light valve suspension distributed in the cross-linked polymer matrix. The light valve suspension comprises particles suspended in a liquid suspending medium. The method comprises admixing a UV cross-linkable liquid oligomer or polymer and the liquid light valve suspension, emulsifying the resulting admixture to form an emulsion of the liquid light valve suspension in the UV cross-linkable liquid oligomer or polymer, and cross-linking the UV cross-linkable liquid oligomer or polymer while the mixture is in the form of a thin layer of the emulsion by exposing the layer to UV radiation or to an electron beam, such that the film is not damaged due to such exposing. The oligomer or polymer and the particles are free of deleterious effects on one another. The index of refraction of the polymer matrix and the liquid light valve suspensions are the same or as near to equal as possible.

14 Claims, 1 Drawing Sheet

ULTRAVIOLET RADIATION-CURABLE LIGHT-MODULATING FILM FOR A LIGHT VALVE, AND METHOD OF MAKING SAME

FIELD OF THE INVENTION

The present invention relates to light valves, variable light transmission plastic films for light valves, and more particularly to improvements relating to such films which can be cured with ultraviolet radiation including methods of making them.

BACKGROUND

For over sixty years, light valves have been proposed for use for modulation of light. As used herein, a light valve comprises a cell formed of two walls that are spaced apart by a small distance, at least one wall being transparent, the walls having electrodes thereon usually in the form of transparent conductive coatings. The cell contains an activatable light-modulating material which may be either a liquid suspension or a plastic film in which droplets of a liquid suspension are distributed and encapsulated. The liquid suspension (sometimes herein called a liquid light valve suspension) comprises small particles suspended in a liquid suspending medium. In the absence of an applied electrical field, the particles in the liquid suspension exhibit random Brownian movement, and hence a beam of light passing into the cell is reflected, transmitted or absorbed, depending upon the cell structure, the nature and concentration of the particles and the energy content of the light. When an electric field is applied through the light valve suspension in the light valve, the particles become aligned and for many suspensions most of the light can pass through the cell. Light valves have been proposed for many purposes including, e.g., alpha-numeric displays, television displays, windows, sunroofs, sunvisors, mirrors, eyeglasses and the like to control the amount of light passing therethrough. Light valves based upon the use of a suspension of particles to modulate light are known as "suspended particle devices" or "SPDs".

For many applications, it is preferable for the activatable material of an SPD light valve to be a plastic film rather than a liquid suspension. For example, in a light valve used as a variable light transmission window, a plastic film in which droplets of liquid suspension are distributed is preferable to a liquid suspension alone because hydrostatic pressure effects e.g., bulging, associated with a high column of liquid suspension, can be avoided through use of a film, and the risk of possible leakage can also be avoided. Also, in a plastic film, the particles are present only within very small droplets, and hence do not noticeably agglomerate when the film is repeatedly activated with a voltage.

One type of light valve film for an SPD light valve which uses microcapsules of suspended particles dispersed in a solid matrix layer is disclosed in U.S. Pat. No. 4,919,521. A second type of SPD light valve film made by phase separation from a homogeneous solution is disclosed in U.S. Pat. No. 5,409,734. SPD light valve films made by crosslinking a cross-linkable film-forming material with a chemical cross-linking agent are disclosed in U.S. Pat. Nos. 5,463,491 and 5,463,492 assigned to the assignee of the present invention. All of those patents and other patents cited herein are incorporated herein by reference.

There are several advantages of UV-curing an SPD film instead of using heat to cure it as is disclosed in U.S. Pat. Nos. 5,463,491 and 5,463,492. An SPD film cured with heat begins to cure as soon as catalyst is added, whereas a UV-curable film will only cure when exposed to ultraviolet radiation. UV-curing also avoids prolonged exposure of the film to heat which might damage the film. Finally, UV-curing can be accomplished much quicker than heat curing. In air, UV-curing can often be effected in less than 1 minute, and in an oxygen-free atmosphere, in only a few seconds.

SUMMARY OF THE INVENTION

In one embodiment of the present invention, a film suitable for use as the light-modulating unit of a light valve is provided, which comprises a polymer matrix which has been cross-linked by ultraviolet radiation. In particular, the polymer matrix is preferably a polymer comprising pendant functional groups that can be cross-linked with ultraviolet radiation in the presence of a suitable photoinitiator. The film may be formed by providing an emulsion of the liquid light valve suspension in a liquid UV-cross-linkable polymer or oligomer, preferably a copolymer, followed by a cross-linking reaction. In order to stabilize the emulsion it is preferable to have either a separate emulsifier, or alternatively one or more polymeric pendant blocks depending from the matrix polymer can act as an emulsifier as disclosed in U.S. Pat. No. 5,463,492.

The film may comprise a cross-linked polyorganosiloxane polymer matrix, and the liquid light valve suspension distributed in the cross-linked polymer matrix may include a fluorinated polymeric stabilizer, whereby the light scatter or "haze" of the light valve film is substantially reduced. As used herein, the term "fluorinated" means a partially or fully fluorinated material. Further improvements in the reduction of the haze may be obtained by providing the cross-linked polyorganosiloxane polymer matrix with aromatic groups or by blending materials with the polymer matrix which comprise aromatic groups, which materials are miscible with the polymer matrix but not miscible with the liquid light valve suspension. Alternatively, fluorinated materials may be blended with the liquid light valve suspension, which materials are miscible with the liquid light valve suspension but not miscible with the polymer matrix.

The objective of these actions is to make the index of refraction of the polymer matrix and that of the liquid light valve suspension the same or as near to equal as possible, whereby haze and light scatter can be substantially reduced or eliminated when the light valve is in the activated or ON state.

As is known from U.S. Pat. No. 5,463,492, the liquid light valve suspension has a liquid suspending medium that comprises in whole or in part a liquid polymeric stabilizer, which enables the liquid light valve suspension to be loaded with a larger concentration of particles. The resulting liquid light valve suspension, whether used as such in a light valve or incorporated into a film, is stable and provides good contrast between the ON and OFF states.

The present invention also provides a light valve, comprising a cell having spaced apart cell walls and a film of the invention between the cell walls.

The Liquid Light Valve Suspension

Figures 1A, 1B:
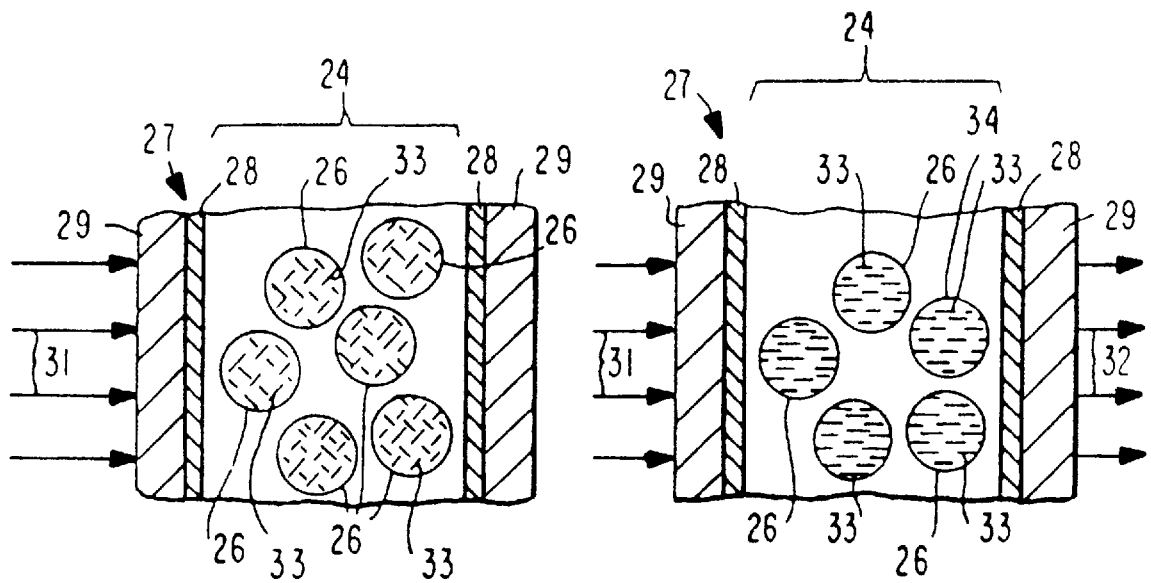
FIGS. 1A and 1B are schematic views, in section, of a light valve of the invention in the OFF and ON states, respectively.

The liquid light valve suspension distributed in the cross-linked polymer matrix of the film of the present invention may be any liquid light valve suspension known in the art and may be formulated according to known techniques. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed.

As is known, inorganic and organic particles may be used in a light valve suspension, such as mica, metals, graphite, metal halides, polyhalides (sometimes referred to in the prior art as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). If a polyhalide of an alkaloid acid salt is used, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light-absorbing or light-reflecting.

Also, the particles may be particles of a hydrogenated polyhalide of a quinine alkaloid acid salt, such as dihydrocinchonidine sulfate polyiodide, as described in U.S. Pat. No. 4,131,334, or a light-polarizing metal halide or polyhalide, such as cupric bromide or purpureocobaltchloride sulfate polyiodide, as, e.g., in U.S. Pat. No. 1,956,867. Preferably, the particles are light-polarizing polyhalide particles, such as those described in U.S. Pat. Nos. 4,877,313 and 5,002,701, which are more environmentally stable than prior art polyhalides.

In theory, any type of particle capable of reflecting, absorbing and/or transmitting desired wavelengths of visible light can be used in the liquid light valve suspension provided that the particle can be oriented by an electric or magnetic field. For the purposes of the present invention, however, particles that reflect a substantial amount of visible light can cause objectionable light scatter and are therefore not usually desirable.

The shape of the particles used in the light valve suspension should preferably be "anisometric", i.e. the shape or structure of the particle is such that in one orientation the particle intercepts more light than in another orientation. Particles which are needle-shaped, rod-shaped, lath-shaped or in the form of thin flakes, are suitable. Light-polarizing crystals are especially useful because they produce a pleasing visual appearance, but any type of light-absorbing particle, preferably exhibiting very little light scatter, can be employed.

The particles are preferably of colloidal size, that is the particles will have a large dimension averaging about 1 micron or less. It is preferred that most particles have large dimensions less than one-half of the wavelength of blue light, i.e. 2000 Angstroms or less to keep light scatter extremely low.

The particles are also preferably light-absorbing, that is the particles absorb a significant part, preferably most, of the light impinging on them and scatter relatively little of the light that impinges on them. Light-absorbing particles comprise many types of material including colored orientable pigments and dyes, e.g. garnet red, conductive black or grey material such as graphite or carbon black, dichroic dyes such as are widely used in guest-host liquid crystal devices, light-polarizing materials, e.g., cupric bromide, and polyhalides, and especially polyiodides, e.g., those described in conjunction with prior art light valve devices.

The term "polyiodide" as used herein is used in the conventional sense and also in the same sense as the term "periodide" is used in numerous prior art light valve patents, e.g., see column 1 of U.S. Pat. No. 1,951,664 (Land) entitled "Colloidal Suspensions and the Process of Making Same", to indicate a material which is a reaction product of a precursor compound, which may be a sulfate (or certain other salts as described in U.S. Pat. No. 4,270,841) of heterocyclic nitrogenous bases with iodine and an iodide. Such reaction products are often called polyiodide compounds. This type of particle is discussed in detail in "The Optical Properties and Structure of Polyiodides" by D. A. Godina and G. P. Faerman published in The Journal of General Chemistry, U.S.S.R. Vol. 20. pp. 1005–1016, (1950). Herapathite, for example, is quinine bisulfate polyiodide, and its formula is given under the heading "quinine iodosulfate" as $4C_{20}H_{24}N_2O_2.3H_2SO_4.2HI.I_4.6H_2O$ in The Merck Index, $10^{th}$ Ed. (Merck & Co., Inc., Rahway, N.J.). In more modern, preferred types of polyiodides, the precursor compound need not be a salt, e.g., see U.S. Pat. Nos. 4,877,313 and 5,002,701. In these polyiodide compounds the iodine is thought to form chains and the compounds are strong light polarizers. The term "polyhalide" is used herein to mean a compound such as a polyiodide, but wherein at least some of the iodine in the iodide is replaced by another halogen.

The liquid light valve suspension distributed in the film of the present invention may include any of the liquid suspending media previously proposed for use in light valves for suspending the particles. In general, the liquid suspending medium may comprise one or more electrically resistive, chemically inert liquids that will both suspend the particles and dissolve any polymeric stabilizer used to reduce the tendency of the particles to agglomerate and thus keep the particles in suspension. Liquid suspending media known in the art are useful herein, such as the liquid suspending media disclosed in U.S. Pat. No. 4,247,175. In general one or both of the liquid suspending medium or the polymeric stabilizer dissolved therein is chosen so as to maintain the suspended particles in gravitational equilibrium.

A light valve suspension useful in the present invention is described in U.S. Pat. No. 4,407,464 and is based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance trialkyl trimellitate, etc. to provide gravitational equilibrium to the suspended particles and to assist in dispersing the particles in the liquid suspending medium. Other materials useful as the miscible electrically resistive organic liquid are those disclosed in U.S. Pat. No. 4,772,103, and details concerning the liquid suspending material may be found in U.S. Pat. No. 4,407,565.

Other types of suspensions which do not incorporate such halogenated liquids can also be used and can maintain the particles in gravitational equilibrium if a sufficient quantity of stabilizing polymer is employed therein.

As is known, another useful light valve suspension is based on the use as the liquid suspending medium of non-volatile or minimally volatile organic liquids, commonly classified as plasticizers. Such "plasticizer" liquid suspending media may comprise one or more electrically resistive, chemically inert, relatively non-volatile (high boiling) organic liquids that will suspend the particles and will dissolve the polymeric stabilizer but not the matrix polymer. For example, where the polymeric stabilizer includes a solid poly(meth)acrylate, useful liquid suspending media include liquid plasticizers for poly(meth) acrylates, such as adipates, benzoates, glycerol triacetate, isophthalates, mellitates, oleates, chloroparaffins, phthalates, sebacates and the like. Liquid suspending media for other solid polymeric stabilizers may be similarly selected from liquids useful as plasticizers for such polymers. Preferably, trialkyltrimellitates, such as tri-n-propyl, tri-n-butyl, tri-n-pentyl or tri-n-hexyl-trimellitate and/or dialkyl adipates, such as di-2-ethylhexyl adipate, may be used as the liquid suspending medium for solid polymeric stabilizers based on copolymers such as copolymers of neopentyl(meth)acrylate.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which in effect, provides a plain surface coating for the particles and one or more additional types of solid polymeric stabilizer that bond to or associate with the first type of solid polymeric stabilizer and also dissolve in the liquid suspending medium to provide dispersion and stearic protection for the particles.

Preferably, to keep the particles in suspension, the liquid suspending medium may also comprise as the solid polymeric stabilizer an A-B type block polymer as disclosed in U.S. Pat. No. 5,279,773.

Nitrocellulose and/or other solid polymeric stabilizers may also be usefully provided in the liquid suspending medium in addition to the block polymer. It is preferred to use just enough A-B block polymer to maintain the particles in suspension, the amount to be used for a given light valve suspension being empirically determined, as is known. Usually, the amount of the solid polymeric stabilizer will be from about 1% to about 30%, such as from 5% to about 25%, by weight, based on the total weight of the liquid light valve suspension. However, while the use of a solid polymeric stabilizer is preferred, it need not be used in all cases. Indeed, liquid polymeric stabilizers may be used to advantage, as described in detail hereinafter.

Liquid Polymeric Stabilizers

The polymeric stabilizers previously used in a liquid light valve suspension have generally been glassy solids. A concentrate of a liquid light valve suspension made using a glassy solid polymer as the polymeric stabilizer must also use a liquid suspending medium that includes a solvent, as described above, to enable the concentrate to be processed into a usable film, but the solvent imposes limitations on the amount of particles that can be included in the concentrate. However, where the polymeric stabilizer is a liquid polymer, such as described in U.S. Pat. No. 5,463,492, the liquid polymeric stabilizer can provide part, or preferably all, of the liquid suspending medium and thus the concentrate can contain a much larger percentage of particles, which in turn enables the production of a thinner, darker film than otherwise.

Also where the matrix polymer and the polymeric stabilizer have both been modified by the substitution of phenyl and fluorine, respectively, it would be very difficult to find a solvent that would dissolve one without dissolving the other. An additional problem encountered with the use of a solvent for a solid polymeric stabilizer is that if the refractive index of the solvent is much higher than that of the matrix polymer and solid polymeric stabilizer, it can increase the amount of haze in the film. These problems are avoided by the use of a liquid polymeric stabilizer.

The liquid polymeric stabilizer is prepared in a conventional manner by using a monomer or monomers that will provide the polymeric stabilizer with a sufficiently low glass transition temperature so that the polymeric stabilizer is liquid in the operating temperature range of the light valve. For example, the proper selection of pendant alkyl groups, with respect to the number of carbon atoms as well as the presence or absence of branching as is shown in the art, enables the production of a polymer with a predetermined glass transition temperature (which may be as low as $-70°$ C.). A low glass transition temperature is desirable because the light valve in which the film is incorporated will only be able to provide variable light transmission above the glass transition temperature of the liquid suspending medium in the droplets. The molecular weight of the polymer will determine the viscosity of the polymeric stabilizer, the higher the molecular weight, the higher the viscosity, as is known. A suitable range of molecular weight for the liquid polymeric stabilizer is from about Mw 1000 to about Mw 2 million.

The monomers for the liquid polymeric stabilizer will be selected as described above so that the resulting liquid polymeric stabilizer will not dissolve the matrix polymer, but will bond to the surface of the particles and be miscible with any other liquids comprising the liquid suspending medium. Where the particles are coated with nitrocellulose, the liquid polymeric stabilizer preferably includes a small percentage of functional groups that enable the polymeric stabilizer to associate with nitrocellulose, such as groups derived from an unsaturated organic acid, ester or anhydride thereof, such as maleic acid anhydride, or other suitable functional groups such a methylol acrylamide, 2-hydroxyethyl(meth)acrylate, etc. Useful liquid polymeric stabilizers include polymerized units of alkyl(meth) acrylates, such as n-butyl acrylate, and/or fluorinated alkyl (meth)acrylates, such as heptafluorobutylacrylate and the like, usually with a small percentage of an unsaturated acid, ester or anhydride thereof, methylol acrylamide, 2-hydroxyethyl(meth)acrylate or the like.

Since the molecular weight of a liquid polymeric stabilizer can be controlled, its viscosity can be adjusted to produce a light valve suspension which consists only of a lower viscosity liquid polymeric stabilizer and particles. Separate liquid suspending medium and polymeric stabilizers are not needed. This light valve suspension can then be encapsulated in a matrix polymer whose index of refraction is matched to that of the liquid polymeric stabilizer to form a low haze film. This is ideal for those cases where it is desirable to produce the film between conductive coated substrates of rigid or flexible glass or plastic without further processing (a sandwich cell). This would be particularly useful in those cases where a fast decay time is not required, for instance in architectural glazing.

Manufacture of the Film

According to the present invention, a film useful as the light-modulating agent of a light valve may be prepared by forming an emulsion of the liquid light valve suspension in a liquid, UV-cross-linkable polymer or oligomer. As disclosed in U.S. Pat. No. 5,463,492, the polymer matrix may be a liquid cross-linkable copolymer emulsifier. The cross-linkable copolymer emulsifier serves the dual function of providing the cross-linked matrix polymer and an emulsifier. The cross-linkable copolymer has a main chain that includes and is preferably terminated by cross-linkable groups at each end, the main chain being insoluble in the liquid light valve suspension. The cross-linkable copolymer emulsifier also has pendant polymeric groups depending from the main chain, the polymeric groups being soluble in the liquid light valve suspension. Alternatively, a separate emulsifier may be used.

The UV-cross-linkable polymer or oligomer has a main chain that comprises UV-cross-linkable groups pendant from the main chain and/or at each end, the main chain being insoluble in the liquid light valve suspension. Any photoinitiator and any photosensitizer that is required to form the polymer matrix is included in the emulsion.

The film of the invention may be prepared by mixing together the liquid UV-cross-linkable polymer or oligomer, photoinitiator, emulsifier (if separate from the UV-cross-linkable copolymer) and liquid light valve suspension, to form an emulsion of a multitude of droplets of liquid light valve suspension in the liquid UV-cross-linkable copolymer. The emulsion can then be cast as a film and cured by radiating it with ultraviolet radiation, thus yielding a film containing encapsulated droplets of the liquid light valve suspension.

The liquid UV-cross-linkable polymer or oligomer and the liquid light valve suspension are chosen so that the components of one will not deleteriously affect the other. Moreover, by-products of the cross-linking reaction, if any, and the cross-linking conditions, e.g., temperature, pressure etc. must also be compatible with and not adversely affect any material involved in the reaction, e.g., the UV-cross-linkable polymer or oligomer, the emulsifier, the cross-linked polymer matrix and/or the light valve suspension. For example, if the particles are heat-sensitive, the cross-linking reaction must take place at a temperature at which the particles are stable. If the particles are adversely affected by water, the by-products of the cross-linking reaction must be non-aqueous.

If cross-linking with ultraviolet radiation is retarded by the presence of oxygen, as is often the case, the cross-linking reaction may take place in a non-oxygen containing atmosphere such as nitrogen or argon or in a vacuum.

The main chain of the liquid UV-cross-linkable polymer or oligomer may be or comprise a polyorganosilaxane, polybutadiene, polystyrene, poly(cyclopropene), polyamide, polyolefin, silicone gum, polyacrylamide or, polyurethane, and the like. The liquid UV-cross-linkable polymer or oligomer will inherently have functional groups that enable it to be cross-linked by UV-radiation, such as acrylate, methacrylate or epoxy groups, or it may comprise a polymeric chain that has been modified to include such functional groups. The UV-cross-linkable polymer or oligomer must have a cross-linkable functionality greater than two, as is known, and may comprise a large number of cross-linkable groups, provided that the solubility requirements previously stated herein are met. Such cross-linkable functional groups may be located not only at or near the ends of the main chain but also along the main chain and may be substituted either directly to the main chain or on groups pendant from the main chain.

Appropriate photoinitiators that will cause ultraviolet radiation to cross-link UV-cross-linkable functional groups are known, such as benzoin isobutyl ether and the like. The cross-linking reaction may also be a condensation between polyfunctional monomers that gives rise to a cross-linked polymer.

The liquid cross-linkable polymer or oligomer may be prepared by conventional copolymerization techniques. For example, a prepolymer (I) with functional groups, Y, such as

(I)

may be linked with a second prepolymer (II) having functional groups, X, and B, such as

(II)

to form a liquid cross-linkable copolymer (III) having a main chain terminated by groups which may comprise an unsaturated UV-curable polymerizable double-bond or which are cross-linkable and having pendant UV-curable non-polymeric or polymeric groups, such as

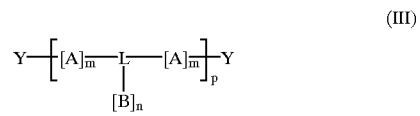

(III)

In the above illustration, m, n, and p are integers, A is the residue of a polymer that is insoluble in the liquid light valve suspension, L is a linking group, and B is a pendant UV-cross-linkable functional group or a chain having such a group substituted thereon. It is possible for the main chain to have pendant polymeric emulsifier groups and pendant functional UV-cross-linkable groups or chains on which such groups are substituted. Alternatively, copolymerization of two or more monomers can be effected. However, at least one of such monomers must comprise a UV-curable functional group.

It is presently preferred to use a polyorganosiloxane as the main chain of the cross-linkable polymer or oligomer. Polyorganosiloxanes comprise repetitive units of silicon atoms linked to oxygen atoms, where the silicon atoms are substituted by one or usually two organic groups which can be substituted or unsubstituted, and, of course, they also comprise cross-linkable functional groups. Useful organic groups which may or may not have cross-linkable functional groups substituted thereon include aliphatic, cycloaliphatic, aromatic, heterocyclic, aromatic aliphatic and the like, said organic group preferably being saturated aliphatic or aromatic, and most preferably, alkyl, aryl, aralkyl or alkalyl. Useful groups comprising cross-linkable functional groups include acryloxy alkyl, methacryloxyalkyl and epoxy and other groups, preferably acryloxypropyl, methacryloxypropyl, maleate, vinyl ether and epoxy groups.

Difunctional vinyl ether or acrylate monomer can be blended into the formulation in order to accelerate the curing process, as well as to generate interpenetrating polymer networks.

The polyorganosiloxane main chain may be a homopolymer, such as homopolymer of the unit

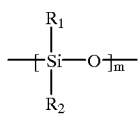

or a copolymer such as

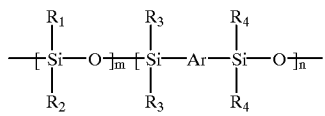

where $R_1$, $R_2$, $R_3$, and $R_4$ are the same or different organic groups at least one of which can be crosslinked with ultraviolet radiation, Ar is an aromatic group and where n and m are integers.

A cross-linked polymer matrix derived from a polyorganosiloxane is preferred for use in the present invention for many reasons. The cross-linked polyorganosiloxanes have excellent oxidation and UV stability and are stable over a wide temperature range.

Because of the wide availability of polyorganosiloxanes and the ease with which they may be cross-linked and the absence of harmful by-products from the cross-linking reaction, these polymers are relatively inexpensive to make and use.

Moreover, a cross-linked polyorganosiloxane polymer or oligomer can be used with a broad range of particles, liquids and polymeric stabilizers used in light valve suspensions. Equally important, the cross-linked polyorganosiloxane polymer matrix provides the film with a high dielectric strength, which allows for the use of large voltages across the light valve cell without arcing.

When the main chain of the UV-cross-linkable polymer or oligomer is polyorganosiloxane, it is preferred that the pendant groups are or comprise acryloxy, methacryloxy or epoxy groups and the like. In a presently preferred embodiment of the invention, the pendant groups are or comprise the acryloxypropyl group.

The properties of the UV-cross-linkable functional groups are selected to insure that the cross-linkable polymer or oligomer remains insoluble in the liquid light valve suspension, so that the desired emulsion can be formed. For example, for a UV-cross-linkable polyorganosiloxane, it is presently preferred that the UV-cross-linkable functional groups be no more than about 20 mol % of the matrix polymer. Likewise, the aromatic content of a UV-cross-linkable polyorganosiloxane is selected to insure that the UV-cross-linkable polymer or oligomer is insoluble in the liquid light valve suspension. For example, for a UV-cross-linkable polyorganosiloxane, it is presently preferred that the aromatic groups be no more than about 30 mol % of the matrix polymer.

It is also known in the art that vinyl ether monomers and oligomers are useful additives and diluents in cationic photo-curable systems containing, for example, epoxy functionalities. For example, see U.S. Pat. No. 5,650,453. If used in the present invention, a reactive vinyl ether monomer or oligomer may be independently cross-linkable by virtue of the presence of vinyl ether groups present in the monomer. Incorporation of such materials in the present invention, after curing will result in two interpenetrating polymerized polymer networks that may or may not be cross-linked to each other at certain points.

Although it is preferred to cure the matrix polymers of the present invention by exposing the uncured film to ultraviolet radiation, it is known in the art that such ultraviolet radiation-curable polymers and films can also be cured by using electron beam curing methods.

A suitable process for preparing a UV-curable liquid cross-linkable copolymer having a polyorganosiloxane main chain and pendant (meth)acryloxypropyl groups is a condensation copolymerization of hexamethylcyclotrisiloxane and 3-acryloxy propylmethyldimethoxysilane.

Suitably, the polyorganosilane moiety of the UV-curable liquid cross-linkable copolymer may have a molecular weight of from about Mw 17,000 to about Mw 3 million, preferably from about Mw 30,000 to about Mw 450,000. Moreover, it is at present contemplated that the polyorganosiloxane main chain will constitute more than about 50%, preferably more than about 80% by weight, of the cross-linkable copolymer emulsifier.

The UV-cross-linkable polymer or oligomer can be used to form a film with the aid of a separate emulsifier. The emulsifier ensures that each droplet of light valve suspension will be surrounded by the polyorganosiloxane matrix polymer, thus avoiding bleeding of light valve suspension from imperfectly enclosed droplets. The emulsifier also prevents coalescence of the droplets, which enables the production of smaller capsules and a smaller size distribution of the capsules. Alternatively, polymeric groups, either polymerized through polymerizable functional end groups on the main chain of the matrix polymer, or pendant from the main chain, may serve as emulsifiers.

Reduction of Haze in the Film

Light valves of the prior art described in many of the above mentioned patents, e.g., U.S. Pat. No. 4,407,565 which use light-absorbing particles, exhibit excellent optical clarity and scatter very little light even though the index of refraction $n_D$ of the liquid suspending medium of their liquid light valve suspensions is far less than the index of refraction of the electrode material. For example, the index of refraction of one commonly used electrode material, indium tin oxide, is about 2.0 at room temperature (although it can be somewhat higher or lower depending on layer thickness), whereas the index of refraction, $n_D$, for the liquid suspending medium will fall in the range of 1.33–1.68 and is usually in the range of about 1.38–1.56 at room temperature. Likewise $n_D$ for the liquid suspending medium can be substantially lower or higher than that of the glass sheets usually used as the walls of the light valve. The refractive index of glass varies according to the composition of the glass but is commonly about 1.52 at room temperature.

Although some light is lost in a light valve by absorption in or by reflection from the electrodes and walls, no objectionable light scatter is normally caused by them despite the fact that their refractive indices usually differ substantially from that of the liquid suspending medium. Hence, the refractive indices of the walls and electrodes of the light valve can be ignored.

As is known from U.S. Pat. No. 4,563,492, the haziness or light scatter of a film comprising a cross-linked polymer matrix having a liquid light valve suspension incorporated therein can be reduced by modifying the polymer matrix and/or the liquid portion of the liquid light valve suspension which contains or is a polymeric stabilizer so that their indices of refraction are more closely matched. In the preferred system of the present invention employing a UV-cured polyorganosiloxane as the cross-linked polymer matrix, this can be accomplished by using a liquid fluorinated polymeric stabilizer in the liquid light valve suspension to lower the index of refraction of the polymeric stabilizer. Alternatively, improvement is possible if the UV-cured polyorganosiloxane contains aromatic groups to raise the index of refraction of the polymer matrix, or if a polymeric or non-polymeric compound comprising aromatic groups is blended with the matrix polymer and is miscible therewith but immiscible with the liquid suspension, or if a polymeric or non-polymeric fluorinated compound is blended with the liquid suspension and is miscible therewith but immiscible with the polymer matrix, or if one uses any combination of the means described in this paragraph.

DETAILED DESCRIPTION OF THE DRAWINGS

Referring to FIG. 1A, a beam of light 31 impinges on a film 27 of the present invention. Film 27 comprises a film 24 containing droplets 26, with electrodes 28 in contact with film 24. Protective layers 29 are in contact with each electrode 28. It is assumed that no potential difference, i.e., electric field, exists between the electrodes 28. Hence the particles 33 dispersed within the microdroplets 26 of the liquid suspension are in random positions due to Brownian Movement. Because the particles absorb light, a beam of light 31 impinging on the film is absorbed by particles 33 within the microdroplets 26. FIG. 1B assumes that an electric field (not shown) exists between the electrodes 28. As a result the particles 33 align within the microdroplets 26 and a considerable portion of the beam of light 31 passes through the film as indicated by the arrows 32.

Electrodes for use in light valves and methods of depositing electrodes on glass and plastic substrates are well known in the art. For example, see U.S. Pat. Nos. 3,512,876 and 3,708,219 which disclose use of electrodes in light valves, and see U.S. Pat. Nos. 2,628,927, 2,740,732, 3,001, 901 and 3,020,376 which disclose articles having conductive and especially conductive transparent coatings on glass and plastic substrates and methods of forming or depositing such coatings. Indium tin oxide ("ITO") or other conductive metal can be used.

It is presently preferred that the electrode 28 and protective layer 29 be in the form of a prefabricated assembly. Thus, the electrode 28 and protective layer 29 can be provided by a film 29, such as a plastic film, that has been coated with an electrode 28 before application of the assembly to the film 24. As used herein the term "electrode" shall be understood to mean not only electrically conductive metal oxide and other coatings used in the art for such purpose but also such coatings which have dielectric overcoatings on them of materials such as silicon m device. On the other hand, if the light valve were intended to be used as a display device the electrodes would normally be deposited in patterns in discrete areas of the substrate. The term "electrode" as used herein also comprises use of semiconductor films and plural film layers, both transparent and colored, such as are used in active matrix addressed display devices. In all cases where the film of the present invention is used in a light valve device it is assumed that there are appropriate electrical connections leading to a power supply suitable to operate the device.

Although the usual type of liquid light valve suspension used in a light valve increases in light transmission when voltage is applied, it should be understood that the present invention also comprises light valves, films and liquid light valve suspensions which decrease in light transmission when a voltage is applied, as is disclosed in U.S. Pat. No 4,078,856 or which when activated increase the transmission of radiation in one part of the electromagnetic spectrum and decrease transmission in another part of the spectrum as is disclosed in U.S. Pat. No. 3,743,382.

The film of the present invention can itself function as a light valve provided that it has electrodes on its surfaces or protective layers. However, if the film itself is to function as a light valve, electrodes should preferably be on the inside surface of each protective layer facing the interior part of the film to avoid being scratched and to minimize voltage required to activate the film. Also the external surfaces of the protective plastic layers may have thereon an ultraviolet absorbing lacquer filter such as the type sold by E.M. Chemicals of Hawthorne, N.Y. Numerous other clear surface coatings are commercially available to reduce abrasion and environmental attack especially on plastics. One such system is produced by the Silicone Products Division of General Electric Co., Waterford, N.Y., comprising a hard coating primer Hard Coating Resin. A radiation-curable clear coating that resists abrasion and ultraviolet degradation is sold by The Sherwin Williams Company of Chicago, Ill. Under the name Permaclear UV.

The same types of surface coatings may be useful with other embodiments of the present invention, particularly where the film is sandwiched between hard plastic substrates such as polycarbonate.

The present invention is illustrated by the following Examples. All parts and percentages are by weight unless otherwise noted.

EXAMPLE 1

Preparation of UV-Cross-Linkable Siloxane Copolymer Containing Internal Phenyl and Pendant Acryloxypropyl Groups The UV-cross-linkable copolymer was prepared as follows: To a three-necked 500 ml round bottom flask, equipped with a thermometer, condenser and Teflon-coated magnetic stirrer, were charged 44.40 g of hexamethylcyclotrisiloxane, 18.20 g of 1,4-bis (hydroxydimethylsilyl)benzene, 11.20 g of 3-acryloxypropylmethyldimethoxysilane and 100 ml of anhydrous ethyl acetate. The combined reactants were heated to 64° C. with stirring, forming a solution. Upon the addition of 4 ml of concentrated sulfuric acid, the solution temperature rose to 79° C. The reaction solution was then refluxed for one hour and a half. The solution was allowed to cool to the room temperature before 10 g of sodium carbonate was added to neutralize the solution. The white solid was filtered off and the solvent was removed by using a rotary evaporator.

The procedure yielded 59.94 g of a clear, colorless liquid with a refractive index of 1.4434 at 22.4° C. and a viscosity of 423 cp at 22.9° C.

EXAMPLE 2

Preparation of n-Butyl Acrylate Fluorocopolymer

A liquid suspending polymer was prepared as follows: To a three-necked 500 ml round bottom flask, equipped with a thermometer, condenser, Teflon-coated magnetic stirrer and nitrogen blanket, were charged 33.20 g of n-butyl acrylate, 16.23 g of 2,2,3,3,4,4,4-heptafluorobutyl acrylate, 1.00 g of 2-hydroxyethyl acrylate and 8.38 g of 1-hexanethiol. The mixture was dissolved in 90 ml of hexyl acetate. When the solution was heated to 120° C., 2.01 g of t-butylperoxybenzoate dissolved in 20 ml of hexyl acetate was added via the addition funnel over an one-minute period. The temperature of the reaction solution went up to 164.5° C. in a minute. The reaction solution was then allowed to reflux at 168° C. for one hour and a half. The residual monomers, chain transfer agent and the solvent were removed by using a rotary evaporator.

This procedure yielded 57.28 g of a yellow, clear liquid with a refractive index of 1.4434 at 22.1° C. and a viscosity of 147 cp at 22.5° C.

EXAMPLE 3

An emulsifier was prepared as follows: To a three-necked 250 ml round bottom flask, equipped with a thermometer, condenser, Teflon-coated magnetic stirrer and nitrogen blanket, were charged 17.71 g of monomethacryloxypropyl terminated polydimethylsiloxane (PS560-KG, United Chemical Technologies, Inc.) and 90 ml ethyl acetate. When the solution was heated to reflux, the solution containing 17.72 g of n-butyl acrylate, 0.089 g of 2,2'-azobisisobutyronitrile and 10 ml of ethyl acetate was added over a 30-minute period. The reaction solution was allowed to reflux for additional two hours and a half after the addition of the initiator and the monomer was completed. The solvent and residual monomer were removed by using a rotary evaporator.

This procedure yielded 29.88 g of a clear, colorless and very viscous liquid with a refractive index of 1.4366 at 22.2° C.

EXAMPLE 4

An alternative emulsifier was prepared in two steps:

Step (1) Acryloxypropyl-Terminated Siloxane Copolymer Containing Internal Phenyl Groups To a three-necked 250 ml round bottom flask, equipped with a thermometer, condenser and Teflon-coated magnetic stirrer, are charged 22.2 g of hexamethylcyclotrisiloxane, 9.1 g of 1,4-bis(hydroxydimethylsilyl)benzene, 1.8 g of 3-acryloxypropyldimethylmethoxysilane and 50 ml of anhydrous ethyl acetate. The combined reactants are heated to 65° C. with stirring, forming a solution. After 2 ml of concentrated sulfuric acid is added, the reaction solution is then refluxed for one hour and a half. The solution is allowed to cool to the room temperature before 5 g of sodium carbonate is added to neutralize the solution. The white solid is filtered off and the solvent is removed by using a rotary evaporator.

(2) Siloxane and n-Butyl Acrylate Copolymer: To a three-necked 250 ml round bottom flask, equipped with a thermometer, condenser, Teflon-coated magnetic stirrer and nitrogen blanket, are charged 17.7 g of acryloxypropyl terminated siloxane copolymer (a product from step (1)) and 90 ml ethyl acetate. When the solution is heated to reflux, the solution containing 17.7 g of n-butyl acrylate, 0.09 g of 2,2'-azobisisobutyronitrile and 10 ml of ethyl acetate is added over a 30-minute period. The reaction solution is then allowed to reflux for additional two hours and a half after the addition of the initiator and the monomer is completed. The solvent and residual monomer are removed by using a rotatory evaporator.

EXAMPLE 5

A cross-linkable emulsifier was prepared as follows: To a three-necked 100 ml round bottom flask, equipped with a thermometer, condenser, Teflon-coated magnetic stirrer and nitrogen blanket, were charged 0.03 g of 3-acryloxypropyltrimethoxysilane, 0.45 g of n-butyl acrylate, 0.23 g of 2,2,3,3,4,4,4-heptafluorobutyl acrylate, 0.02 g or 2,2'-azobisisobutyronitrile, and 20 ml of anhydrous ethyl acetate. The solution was heated to reflux at 78° C. After the reaction solution refluxed for four hours and a half, a solution containing 4.01 g of the cross-linkable copolymer of Example 1, 0.03 g of dibutylin dilaurate, and 20 ml of anhydrous ethyl acetate was added. The residual monomers and the solvent were removed by using a rotary evaporator.

This procedure yielded 3.94 g of a colorless, nearly clear liquid with a refractive index of 1.4451 at 21.7° C.

EXAMPLE 6

A film was prepared as follows: To a one-ounce jar, were added 2.00 g of the UV-curable matrix polymer of Example 1, 1.60 g of the suspending polymer of Example 2, 0.31 g of a concentrate consisting of 25 wt % of crystals of pyrazine-2,5-dicarboxylic acid calcium polyiodide with a trace of ¼ sec SS type nitrocellulose and 75 mol % of a random copolymer of 78.2 mol % n-butyl acrylate/19.2 mol % 2,2,3,3,4,4,4-heptfluorobutyl acrylate/2.6 mol % 2-hydroxyethyl acrylate, 0.39 g of the emulsifier of Example 3, and 0.06 g of benzoin isolbutyl ether. The mixture was homogenized manually for more than four minutes. The mixture was spread in a layer 3 mils thick onto a piece of ITO-coated glass. The film was then degassed and sandwiched by a second piece of ITO-coated glass in a vacuum. The film was exposed to the UV-lamp (Cure Zone, 80 mw/cm² at 365 nm, ADAC Technologies, Inc.) for 30 seconds.

The OFF state transmission of the cell thus formed was 31.77%, and the ON state transmission (50 V, 400 Hz) was 65.20%. The OFF state haze of the cell was 27.5%, and the ON state haze was 14.7%

EXAMPLE 7

A film was prepared as follows: To a one-ounce jar, were added 1.00 g of the cross linkable emulsifier of Example 5, 0.80 g of the suspending polymer of Example 2, 0.18 g of a concentrate consisting of 25 wt % of crystals of pyrazine-2,5-dicarboxylic acid calcium polyiodid with a trace of ¼ sec SS type nitrocellulose and 75 mol % of a random copolymer of 78.2 mol % n-butyl acrylate/19.2 mol % 2,2,3,3,4,4,4-heptfluorobutyl acrylate/2.6 mol % 2-hydroxyethyl acrylate, and 0.03 g of benzoin isobutyl ether. The mixture was homogenized manually for more than four minutes. The mixtures was spread in a layer 3 mils thick onto a piece of ITO-coated glass.[1] The film was exposed to the UV-lamp (Cure Zone, 80 mw/cm² at 365 nm, ADAC Technologies, Inc.) for 50 seconds.

[1] The film was then degassed and sandwiched by a second piece of ITO-coated glass in a vacuum.

The OFF state transmission of the cell thus formed was 20.93%, and the ON state transmission (50 V, 400 HZ) was 62.71%. The OFF state haze of the cell was 31.0%, and the ON state haze was 7.3%.

What is claimed is:

1. A method for preparing a film suitable for use as the light-modulating unit of an SPD light valve, comprising a cross-linked polymer matrix having droplets of a liquid light valve suspension distributed in the cross-linked polymer matrix, said light valve suspension comprising particles suspended in a liquid suspending medium; which comprises admixing a UV-cross-linkable liquid oligomer or polymer and said liquid light valve suspension, emulsifying the resulting admixture to form an emulsion of said liquid light valve suspension in said UV-cross-linkable liquid oligomer or polymer, and cross-linking said UV-cross-linkable liquid oligomer or polymer while said mixture is in the form of a thin layer of said emulsion by exposing said thin layer of said emulsion to UV-radiation or to an electron beam such that said film is not damaged due to said exposing, said oligomer or polymer and said particles being free of deleterious effects on one another wherein the index of refraction of the polymer matrix and the liquid light valve suspension are the same or as near to equal as possible.

2. The method according to claim 1, wherein the emulsion contains an emulsifier.

3. The method according to claim 1, wherein said liquid cross-linkable oligomer or polymer has a main chain that is insoluble in said liquid suspending medium and pendant polymeric groups that are soluble in said liquid suspending medium, whereby said oligomer or polymer functions as an emulsifier.

4. The method according to claim 3, wherein said main chain comprises a polyorganosiloxane.

5. The according to claim 4, where said pendant polymeric groups are polyacrylates and/or polymethacrylates.

6. The method according to claim 4, wherein said polyorganosiloxane contains internal aromatic groups.

7. The method according to claim 1, wherein said emulsion includes a photoinitiator to initiate said cross-linking.

8. The method according to claim 1, wherein said liquid UV-cross-linkable oligomer or polymer includes acrylate, methacrylate or epoxy groups.

9. The method according to claim 1, wherein said liquid UV-cross-linkable polymer or ligomer is a polyorganosilaxane, polybutadiene, polystyrene, poly (cyclopropene), polyamide polyolefin, silicone gum, polyacrylamide or, polyurethane.

10. The method according to claim 1, wherein said liquid UV-cross-linkable polyorganosiloxane polymer or oligomer has pendant (meth)acryloxypropyl groups or acryloxypropyl groups.

11. The method according to claim 1, wherein said polyorganosiloxane contains internal phenyl groups.

12. The method according to claim 1, wherein said emulsion contains a liquid polymeric stabilizer to prevent agglomeration of said particles.

13. The method according to claim 12, wherein said liquid polymeric stabilizer is fluorinated.

14. A method of preparing a film suitable for use as the light-modulating unit of an SPD light valve, comprising a cross-linked polyorganosiloxane polymer matrix having droplets of a liquid light valve suspension distributed in the cross-linked polyorganosiloxane polymer matrix, said light valve suspension comprising particles suspended in a liquid suspending medium; which comprises admixing a UV-cross-linkable liquid polyorganosiloxane oligomer or polymer and said liquid light valve suspension, emulsifying the resulting admixture to form an emulsion of said liquid light valve suspension in said UV-cross-linkable liquid polyorganosiloxane oligomer or polymer, and cross-linking said UV-cross-linkable liquid polyorganosiloxane oligomer or polymer while said admixture is in the form of a thin layer of said emulsion by exposing said thin layer of said emulsion to UV-radiation or to an electron beam such that said film is not damaged due to said exposing, wherein the index of refraction of the polymer matrix and the liquid light valve suspension are the same or as near to equal as possible.

* * * * *